United States Patent
Kinomura

(10) Patent No.: US 10,807,484 B2
(45) Date of Patent: Oct. 20, 2020

(54) HYBRID VEHICLE AND METHOD OF CONTROLLING THE SAME

(71) Applicant: Toyota Jidosha Kabushiki Kaisha, Toyota-shi, Aichi-ken (JP)

(72) Inventor: Shigeki Kinomura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 163 days.

(21) Appl. No.: 15/859,911

(22) Filed: Jan. 2, 2018

(65) Prior Publication Data

US 2018/0201149 A1    Jul. 19, 2018

(30) Foreign Application Priority Data

Jan. 19, 2017    (JP) .................... 2017-007458

(51) Int. Cl.
B60W 20/15    (2016.01)
B60L 53/00    (2019.01)
(Continued)

(52) U.S. Cl.
CPC ............ B60L 53/00 (2019.02); B60K 6/28 (2013.01); B60L 11/1862 (2013.01);
(Continued)

(58) Field of Classification Search
CPC .......... B60L 58/13; B60L 58/14; B60L 58/15; B60L 53/00; B60K 6/28; Y02T 10/70;
(Continued)

(56) References Cited

U.S. PATENT DOCUMENTS

| 6,546,329 B2 * | 4/2003 | Bellinger | ............ F02D 41/1497 701/115 |
| 6,944,532 B2 * | 9/2005 | Bellinger | .......... B60W 30/1882 701/115 |

(Continued)

FOREIGN PATENT DOCUMENTS

| CN | 102883934 A | 1/2013 |
| JP | 2009-126456 A | 6/2009 |

(Continued)

OTHER PUBLICATIONS

Electric Vehicle Aggregator/System Operator Coordination for Charging Scheduling and Services Procurement, Miguel A. Ortega-Vazquez ; François Bouffard ; Vera Silva; Published in: IEEE Transactions on Power Systems ( vol. 28 , Issue: 2 , May 2013 ); pp. 1806-1815 (Year: 2013).*

(Continued)

*Primary Examiner* — Cuong H Nguyen
(74) *Attorney, Agent, or Firm* — Dinsmore & Shohl LLP

(57) ABSTRACT

A hybrid vehicle includes a power storage device that stores electric power for traveling, an inlet that receives electric power for use in external charging, and a electronic control unit that performs restricting operation to restrict a practical state of charge region of the power storage device used for control. When the frequency of execution of external charging is smaller than a threshold value, the electronic control unit sets the practical state of charge region to a normal region. When the frequency of execution of external charging is larger than the threshold value, the electronic control unit performs an expanding operation to expand the practical state of charge region from the normal region to an expanded region, by easing restrictions placed by the restricting operation.

7 Claims, 3 Drawing Sheets

(51) Int. Cl.
*B60L 11/18* (2006.01)
*B60K 6/28* (2007.10)
*B60W 50/00* (2006.01)
*B60W 10/08* (2006.01)
*B60W 10/06* (2006.01)
*B60L 50/15* (2019.01)
*B60L 58/13* (2019.01)
*B60L 50/16* (2019.01)
*B60K 6/20* (2007.10)

(52) U.S. Cl.
CPC ............ *B60L 50/15* (2019.02); *B60L 50/16* (2019.02); *B60L 58/13* (2019.02); *B60W 10/06* (2013.01); *B60W 10/08* (2013.01); *B60W 20/15* (2016.01); *B60W 50/0098* (2013.01); *B60K 6/20* (2013.01); *B60L 2240/54* (2013.01); *B60W 2050/0089* (2013.01); *Y02T 10/62* (2013.01); *Y02T 10/70* (2013.01); *Y02T 10/7072* (2013.01); *Y10S 903/903* (2013.01)

(58) Field of Classification Search
CPC ............ Y02T 10/7005; Y02T 10/6286; Y02T 10/7072; Y02T 10/6213
USPC .......................... 180/65.29; 903/903; 701/22
See application file for complete search history.

(56) References Cited

U.S. PATENT DOCUMENTS

| | | | | |
|---|---|---|---|---|
| 6,957,139 | B2* | 10/2005 | Bellinger | F16H 61/0213 |
| | | | | 701/104 |
| 7,957,884 | B2* | 6/2011 | Wakashiro | B60K 6/448 |
| | | | | 701/93 |
| 8,417,408 | B2* | 4/2013 | Wakashiro | B60W 10/08 |
| | | | | 701/22 |
| 8,983,702 | B2* | 3/2015 | Ikegami | B60K 6/48 |
| | | | | 701/22 |
| 2003/0216847 | A1* | 11/2003 | Bellinger | B60W 10/04 |
| | | | | 701/51 |
| 2007/0255478 | A1* | 11/2007 | Wakashiro | B60W 10/06 |
| | | | | 701/93 |
| 2010/0033132 | A1* | 2/2010 | Nishi | B60K 6/365 |
| | | | | 320/136 |
| 2013/0015791 | A1* | 1/2013 | Hatsumi | B60L 7/14 |
| | | | | 318/376 |
| 2013/0030634 | A1 | 1/2013 | Endo et al. | |
| 2013/0049973 | A1* | 2/2013 | Matsumoto | B60L 3/0046 |
| | | | | 340/636.12 |
| 2013/0073136 | A1* | 3/2013 | Yamamoto | B60K 6/445 |
| | | | | 701/22 |
| 2013/0113433 | A1* | 5/2013 | Shibata | B60L 58/12 |
| | | | | 320/134 |
| 2013/0307329 | A1* | 11/2013 | Ito | B60K 6/445 |
| | | | | 307/10.1 |
| 2013/0325237 | A1* | 12/2013 | Ikegami | B60L 58/12 |
| | | | | 701/22 |
| 2014/0163803 | A1* | 6/2014 | Kamatani | B60K 6/445 |
| | | | | 701/22 |
| 2014/0277892 | A1* | 9/2014 | Harada | B60W 10/26 |
| | | | | 701/22 |
| 2016/0152224 | A1* | 6/2016 | Tabata | B60W 20/10 |
| | | | | 701/22 |
| 2016/0152227 | A1* | 6/2016 | Tabata | B60W 20/19 |
| | | | | 701/22 |
| 2017/0282726 | A1* | 10/2017 | Ichikawa | B60L 53/30 |

FOREIGN PATENT DOCUMENTS

| | | |
|---|---|---|
| JP | 2011-131830 A | 7/2011 |
| JP | 2013-041324 A | 2/2013 |
| JP | 2014-015209 A | 1/2014 |

OTHER PUBLICATIONS

J. Clairand, J. Rodríguez-Garcia and C. Álvarez-Bel, "Smart Charging for Electric Vehicle Aggregators Considering Users' Preferences," in IEEE Access, vol. 6, pp. 54624-54635, 2018, doi: 10.1109/ACCESS.2018.2872725. (Year: 2018).*

Assessing Electric Vehicle storage, flexibility, and Distributed Energy Resource potential; Graham Mills, Iain MacGill1 (Year: 2018).*

A review of lithium-ion battery state of charge estimation, Hannan et al., from www.elsevier.com/locate/rser, Renewable and Sustainable Energy Reviews 78 (2017) 834-854. (Year: 2017).*

Improving the Regulation Range of EV Battery Chargers With L3C2 Resonant Converters; Navid Shafiei et al., IEEE Transactions on Power Electronics, vol. 30, No. 6, Jun. 2015. (Year: 2015).*

* cited by examiner

HYBRID VEHICLE AND METHOD OF CONTROLLING THE SAME

CROSS-REFERENCE TO RELATED APPLICATIONS

This application claims priority to Japanese Patent Application No. 2017-007458 filed on Jan. 19, 2017, which is incorporated herein by reference in its entirety including the specification, drawings and abstract.

BACKGROUND

1. Technical Field

The disclosure relates to a hybrid vehicle configured to be able to execute operation (which will be called "external charging") to charge an on-board power storage device with electric power received from outside the vehicle, and a method of controlling the hybrid vehicle.

2. Description of Related Art

In recent years, electric vehicles have been widely prevailing. In Japanese Patent Application Publication No. 2013-41324 (JP 2013-41324 A), a power feeding station capable of supplying electric power for use in external charging, to electric vehicles, is disclosed. The power feeding station gives an incentive for execution of external charging, to users of the electric vehicles, by discounting an external charge fee, according to electric power supply and demand conditions in the station.

SUMMARY

Electrically powered vehicles configured to be able to execute external charging include hybrid vehicles (so-called plug-in hybrid vehicles), as well as electric vehicles.

The electric vehicle uses only electric power of the power storage device as an energy source; therefore, if the power storage device cannot be externally charged, and is totally drained of electric power, the electric vehicle becomes unable to travel. Thus, external charging is essential to traveling of the electric vehicle. Accordingly, it is possible to give a sufficient incentive for execution of external charging, to the user of the electric vehicle, merely by discounting the external charge fee as described in JP 2013-41324 A.

On the other hand, the hybrid vehicle uses fuel (fossil fuel or hydrogen fuel) in a fuel tank, in addition to electric power of the power storage device, as energy sources; therefore, there is a concern that an incentive for execution of external charging may not be sufficiently given to the user of the hybrid vehicle, only by discounting the external charge fee. More specifically, the hybrid vehicle is able to travel with fuel supplied thereto, even if it cannot be externally charged; thus, external charging is not essential to the hybrid vehicle. Therefore, some users of hybrid vehicles do not very often carry out external charging, and simply discounting the external charge fee may be insufficient to encourage such users to carry out external charging.

Also, the hybrid vehicle selectively travels in a motor drive mode using only electric power of the power storage device, or a hybrid drive mode using both the electric power of the power storage device and fuel in a fuel tank. In the case where external charging is executed, and the hybrid vehicle travels in the motor drive mode, there arise some advantages that the fuel consumption efficiency is improved, and the amount of emission of carbon dioxide and air pollution gas caused by combustion of the fossil fuel can be reduced, as compared with the case where the hybrid vehicle travels in the hybrid drive mode. However, if the user does not very often carry out external charging, there is a concern that the above advantageous may be detracted. Accordingly, it is desirable for the user of the hybrid vehicle to be positively provided with an incentive for execution of external charging, so as to yield the above advantages.

The object of the disclosure is to provide a hybrid vehicle that is configured to be able to be externally charged, and positively gives the user of the hybrid vehicle an incentive for execution of external charging, and a method of controlling the hybrid vehicle.

A hybrid vehicle according to a first aspect of the disclosure includes: a power storage device that stores electric power used for traveling, a power receiving unit that receives electric power for use in external charging from outside the vehicle; and an electronic control unit is configured to execute a restricting operation to restrict a control use region of the power storage device. The power storage device is configured to be externally charged with the electric power received by the power receiving unit. In the hybrid vehicle, when the frequency of execution of the external charging is larger than a threshold value, the electronic control unit is configured to execute an expanding operation such that the control use region becomes larger than that in the case where the frequency of execution of the external charging is smaller than the threshold value. The expanding operation is an operation to expand the control use region of the power storage device by easing a restriction placed by the restricting operation.

In the hybrid vehicle as described above, when the frequency of execution of external charging is larger than the threshold value, the expanding operation is executed so as to ease restrictions placed by the restricting operation, and expand the control use region of the power storage device. Namely, through the restricting operation, the control use region of the power storage device is restricted in advance to be smaller than the original potential (the useable range determined in view of protection of components). However, if the user frequently carries out external charging, it is possible to expand the control use region of the power storage device (to be close to the original potential) by easing the restrictions. As a result, an incentive for execution of external charging can be positively given to the user of the hybrid vehicle.

In the hybrid vehicle, the restricting operation may include operation to restrict a control use region of a state of charge of the power storage device, and the expanding operation may include operation to expand the control use region of the state of charge by easing a restriction placed by the restricting operation.

With the above configuration, the control use region of the state of charge (SOC) is expanded by the expanding operation. Thus, the user is able to extend or increase the distance over which the vehicle travels in a motor drive mode, by frequently carrying out external charging. It is thus possible to give the incentive for frequent execution of external charging to the user, so as to increase the distance over which the vehicle travels in the motor drive mode.

In the hybrid vehicle, the restricting operation may include at least one of an operation to restrict an upper-limit value of a control use region of output power of the power storage device, and an operation to restrict an upper-limit value of a control use region of input power of the power storage device. The expanding operation may include at least one of an operation to expand the control use region of the output power by easing a restriction placed by the restricting operation, and an operation to expand the control use region of the input power by easing a restriction placed by the restricting operation.

With the above configuration, when the user frequently carries out external charging, it is possible to increase acceleration power generated by a motor, by easing a restriction on the upper-limit value of the output power of the power storage device, and/or increase regenerative power generated by the motor, by easing a restriction on the upper-limit value of the input power of the power storage device, so that a larger amount of regenerative power can be collected into the power storage device. Thus, it is possible to give an incentive for frequent external charging to the user, so as to increase at least one of the acceleration power and regenerative power generated by the motor.

A second aspect of the disclosure is concerned with a method of controlling a hybrid vehicle. The hybrid vehicle includes a power storage device that stores electric power used for traveling, a power receiving unit that receives electric power for use in external charging from outside the vehicle, and an electronic control unit. The power storage device is configured to be externally charged with the electric power received by the power receiving unit. The method includes: executing, by the electronic control unit, a restricting operation to restrict a control use region of the power storage device, and executing, by the electronic control unit, an expanding operation, when the frequency of execution of the external charging is larger than a threshold value, such that the control use region becomes larger than that in the case where the frequency of execution of the external charging is smaller than the threshold value. The expanding operation is an operation to expand the control use region of the power storage device by easing a restriction placed by the restricting operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
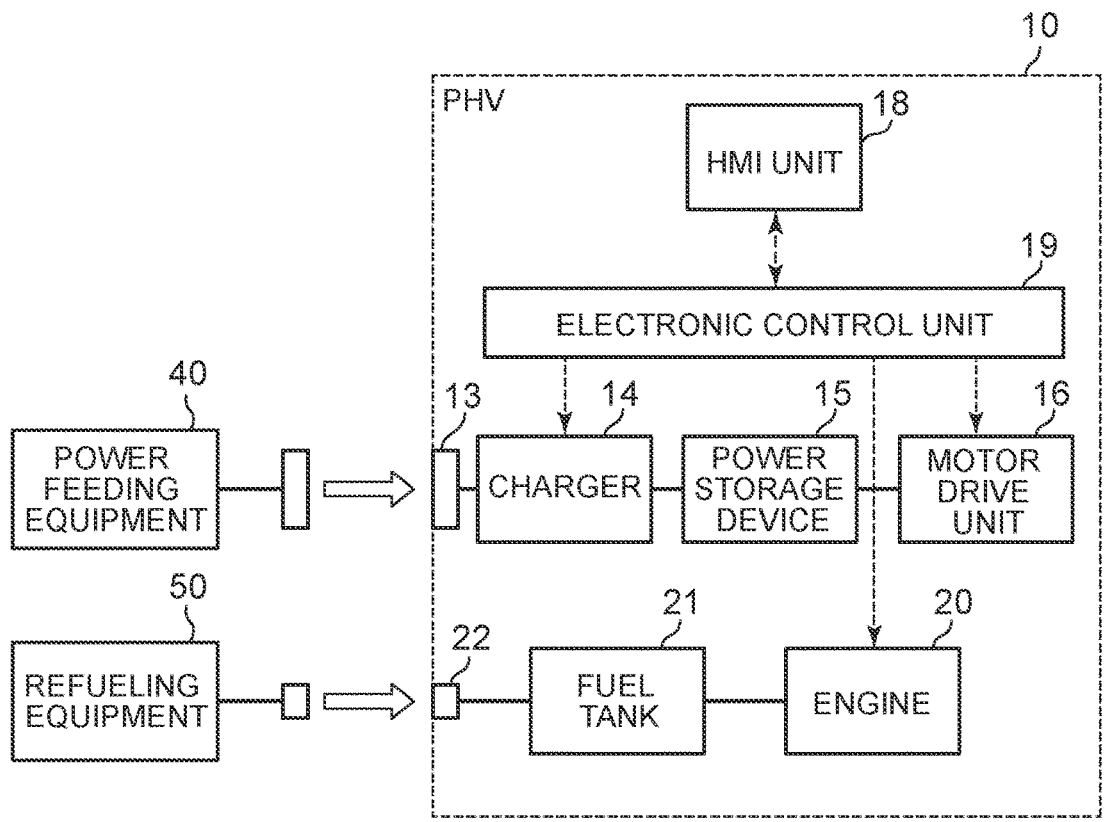
FIG. 1 is a view schematically showing one example of the overall configuration of a vehicle.

One embodiment of the disclosure will be described in detail with reference to the drawings. In the drawings, the same reference numerals are assigned to the same or corresponding portions or components, of which explanation will not be repeated.

FIG. 1 schematically shows one example of the overall configuration of a vehicle 10 according to this embodiment. The vehicle 10 is a hybrid vehicle (so-called plug-in hybrid vehicle) configured to be able to be externally charged, namely, charged with electric power from outside the vehicle.

The vehicle 10 includes an inlet 13, charger 14, electric power storage device 15, motor drive unit 16, HMI (Human Machine Interface) unit 18, electronic control unit 19, engine 20, fuel tank 21, and an oil filler port 22.

The inlet 13 is configured to be able to be connected to a power feeding equipment 40 outside the vehicle, and receives electric power used for external charging, from the power feeding equipment 40. The charger 14 operates according to a control signal from the electronic control unit 19, and externally charges, the power storage device 15 with electric power supplied from the power feeding, equipment 40.

The power storage device 15 is a secondary battery, such as a nickel hydride battery or a lithium-ion battery. The power storage device 15 may also be a large-capacity capacitor.

The motor drive unit 16 generates vehicle driving force, using electric power supplied from the power storage device 15. The motor drive unit 16 includes a motor generator mechanically connected to drive wheels, and a power control unit (such as an inverter) that controls the amount of electric current passed through the motor-generator. The output of the motor drive unit 16 (i.e., the amount of electric current passed through the motor-generator) is controlled according to a control signal from the electronic control unit 19. The motor drive unit 16 may include one motor-generator, or two or more motor-generators.

The HMI unit 18 provides various kinds of information to the user, and receives operations executed by the user. The HMI unit 18 includes a display(s), speaker(s), and so forth, provided in the vehicle cabin. For example, a display and a speaker of a navigation system (not shown) may also be used as the HMI unit 18.

The oil filler port 22 is configured to be able to be connected to a refueling equipment 50 outside the vehicle. The fuel tank 21 stores fossil fuel (such as gasoline, light oil, or natural gas) supplied from the refueling equipment 50. The engine 20 generates power, using the fuel supplied from the fuel tank 21. The output of the engine 20 is controlled according to a control signal from the electronic control unit 19. The engine 20 may be used for generating electric power, or driving the vehicle, or both generating electric power and driving the vehicle.

The electronic control unit 19 incorporates a CPU and a memory (not shown), and controls each device (e.g., the charger 14, motor drive unit 16, HMI unit 18, and the engine 20) of the vehicle 10, based on information stored in the memory and information from each sensor.

In this embodiment, the vehicle 10 is basically configured to travel in a motor drive mode (EV drive mode), using the motor drive unit 16 while stopping the engine 20, until the state of charge (SOC) of the power storage device 15 becomes less than a predetermined value. After the SOC of the power storage device 15 becomes less than the predetermined value, the engine 20 is operated, and the vehicle 10 travels in a hybrid drive mode (HV drive mode), using both the engine 20 and the motor drive unit 16. The vehicle 10 travels with electric power of the power storage device 15 during traveling in the EV drive mode, and travels with both electric power of the power storage device 15 and the fuel of the fuel tank 21, during traveling in the HV drive mode.

As described above, the vehicle 10 of this embodiment uses both the electric power of the power storage device 15 and the fuel of the fuel tank 21 as energy sources. Therefore, the vehicle 10 can travel with the fuel supplied to the fuel tank 21, even if external charging is not carried out, and the power storage device 15 is totally drained of electric power. Accordingly, some users of the vehicle 10 may not very often carry out external charging.

If the user of the vehicle 10 does not very often carry out external charging, there is a concern that advantages of the plug-in hybrid vehicle are detracted. More specifically, the vehicle 10 is basically configured to travel in the EV drive mode without using the fuel, until the SOC becomes less than the predetermined value, and travel in the HV drive mode using the fuel, after the SOC becomes less than the predetermined value, as described above. Accordingly, if the user positively carries out external charging, so as to cause the vehicle 10 to travel in the EV drive mode, the fuel consumption is suppressed or reduced, which leads to advantages, such as improvement of the fuel efficiency, and reduction in the amount of discharge of carbon dioxide $CO_2$ and air pollution gas (e.g., CO, HC, NOx). However, if the user does not very often carry out external charging, it is difficult to yield the above advantages.

In view of the above points, the electronic control unit 19 of this embodiment executes "restricting operation" to restrict the SOC region for use in control (which will also be called "control use region of SOC" or "practical SOC region") of the power storage device 15, to a smaller region than the original potential (the usable SOC region determined in terms of component protection). Then, the electronic control unit 19 determines whether the user positively utilizes EV traveling, by carrying out external charging. If the electronic control unit 19 determines that the user positively utilizes EV traveling, it eases restrictions placed by the restricting operation, thereby to execute "expanding operation" to expand the practical SOC region.

In the manner as described above, it is possible to positively provide the user of the vehicle 10 with an incentive (that will be called "incentive for external charging") for execution of external charging. More specifically, in the vehicle 10, the practical SOC region is restricted in advance to a smaller region than the original potential by the restricting operation; however, if the user frequently carries out external charging, it is possible to expand the practical SOC region, and extend or increase the distance (that will be referred to as "EV travelable distance") over which the vehicle 10 can travel in the EV drive mode. Thus, it is possible to provide the user who frequently carries out external charging, with the incentive that makes it possible to increase the EV travelable distance.

Figure 2:
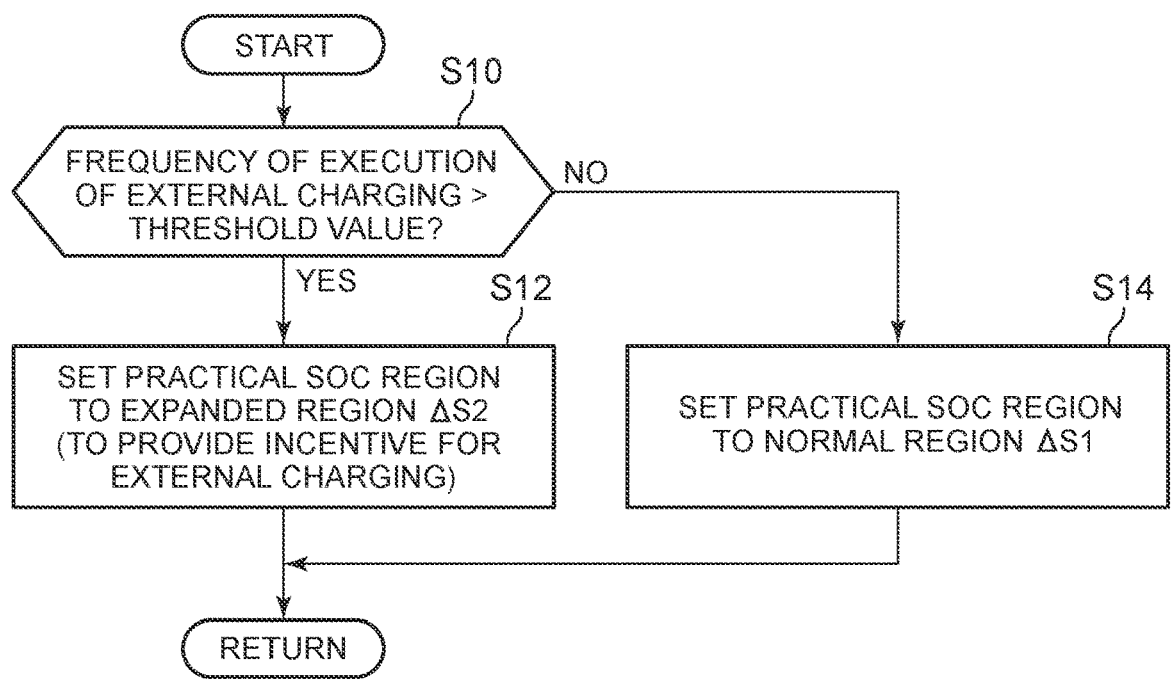
FIG. 2 is a flowchart illustrating one example of a control routine of an electronic control unit according to one embodiment.

FIG. 2 is a flowchart illustrating one example of a control routine executed by the electronic control unit 19 when it provides the user with the incentive for external charging. The control routine of the flowchart of FIG. 2 is repeatedly executed at given time intervals.

The electronic control unit 19 determines whether the frequency of execution of external charging is larger than a threshold value (step S10). This step is provided for determining whether the user positively utilizes EV traveling by carrying out external charging. The "frequency of execution of external charging" is, for example, the number of times of execution of external charging over an immediate predetermined period.

If it is not determined that the frequency of execution of external charging is larger than the threshold value (NO in step S10), the electronic control unit 19 sets the practical SOC region to a normal region ΔS1 (step S14). As a result, the control use region of the SOC is restricted to the normal region ΔS1.

If it is determined that the frequency of execution of external charging is larger than the threshold value (YES in step S10), the electronic control unit 19 sets the practical SOC region to an expanded region ΔS2 that is larger than the normal region ΔS1, and informs the user of the expansion of the SOC region, via the HMI unit 18 (step S12). As a result, the practical SOC region is restricted to the expanded region ΔS2. Since the expanded region ΔS2 is larger than the normal region ΔS1, it is possible to expand the practical SOC region, and increase the EV travelable distance, as compared with the case where the practical SOC region is restricted to the normal region ΔS1. As a result, the incentive for external charging can be given to the user.

In FIG. 2, step S12 and step S14 correspond to the "restricting operation" as described above, and step S12 corresponds to the "expanding operation" as described above.

Figure 3:
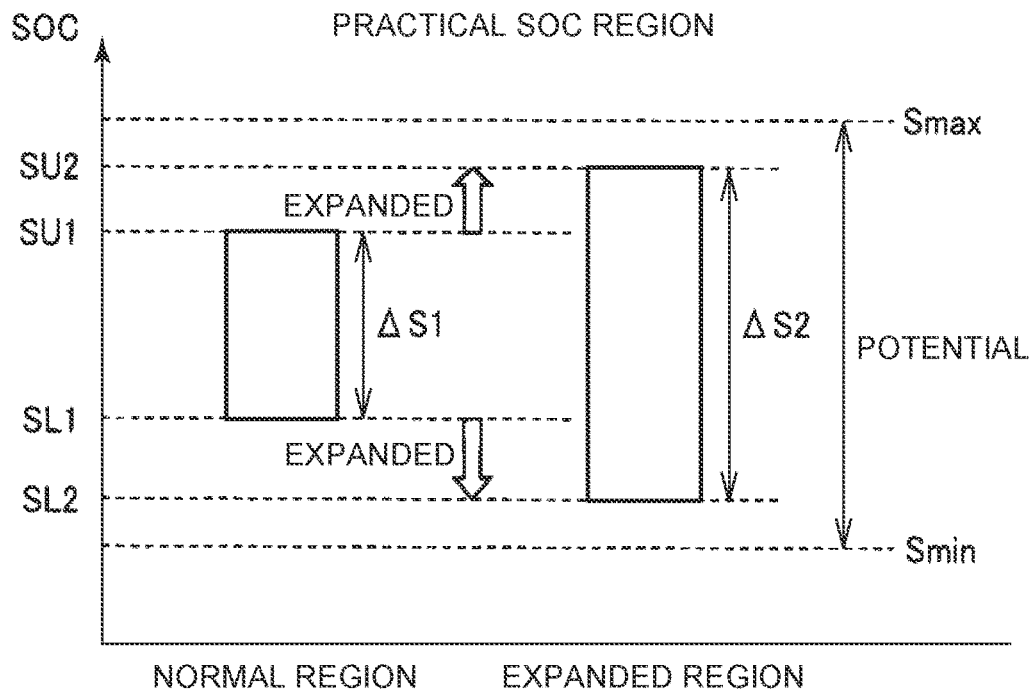
FIG. 3 is a view schematically showing one example of a normal region ΔS1 and an expanded region ΔS2 of a practical SOC region of a power storage device.

FIG. 3 schematically shows one example of the practical SOC region (normal region ΔS1) set in step S14 of FIG. 2, and the practical SOC region (expanded region ΔS2) set in step S12 of FIG. 2.

As shown in FIG. 3, the normal region ΔS1 is an SOC region that is equal to or higher than the lower limit SL1 and equal to or lower than the upper limit SU1, and the expanded region ΔS2 is an SOC region that is equal to or higher than the lower limit SL2 and equal to or lower than the upper limit SU2.

The normal region ΔS1 and the expanded region ΔS2 are both restricted by control operation to smaller regions than the original potential (a region from Smin to Smax).

However, the expanded region ΔS2 is less restricted by the control operation than the normal region ΔS1. More specifically, the lower limit SL2 of the expanded region ΔS2 is set to a smaller value than the lower limit SL1 of the normal region ΔS1, and the upper limit SU2 of the expanded region ΔS2 is set to a larger value than the upper limit SU1 of the normal region ΔS1. In this manner, the expanded region ΔS2 is expanded to be larger than the normal region ΔS1; as a result, it is possible to increase, the EV travelable distance.

As described above, when the frequency of execution of external charging is larger than the threshold value (when the user positively utilizes EV traveling by executing external charging), the electronic control unit 19 of this embodiment eases or reduces restrictions placed by the control operation, so as to expand the practical SOC region from the normal region ΔS1 to the expanded region ΔS2. Therefore, the user of the vehicle 10 can expand the practical SOC region and increase the EV travelable distance, by frequently executing external charging. As a result, it is possible to provide the user with an incentive to frequently carry out external charting so as to increase the EV travelable distance.

FIRST MODIFIED EXAMPLE

In the above-described embodiment, the incentive for external charging is provided by expanding the practical SOC region.

However, the incentive for external charging is not limitedly provided by expanding the practical SOC region. For example, the incentive for external charging may be provided by expanding at least one of a control use region (which will also be called "practical output region") of output power of the power storage device 15, and a control use region (which will also be called "practical input region") of input power of the power storage device 15.

Figure 4:
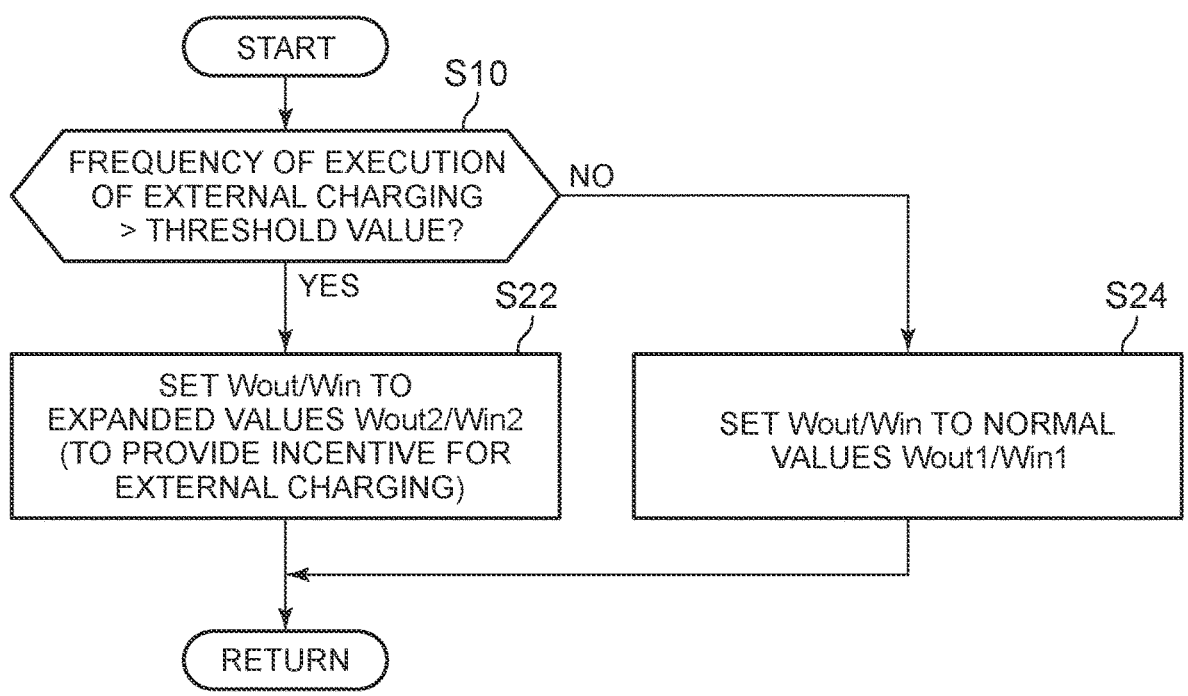
FIG. 4 is a flowchart illustrating one example of a control routine of the electronic control unit according to a first modified example.

FIG. 4 is a flowchart illustrating one example of a control routine executed by the electronic control unit 19 according to a first modified example when the electronic control unit 19 provides the user with the incentive for external charging.

The electronic control unit 19 determines whether the frequency of execution of external charging is larger than the threshold value (step S10). This step is the same as step S10 of FIG. 2, and therefore, will not be repeatedly described in detail.

If it is not determined that the frequency of execution of external charging is larger than the threshold value (NO in step S10), the electronic control unit 19 sets an upper-limit value Wout of the practical output region and an upper-limit value Win of the practical input region to normal values Wout1, Win1, respectively (step S24). As a result, the practical output region is restricted to a region equal to or smaller than the normal value Wout1, and the practical input region is restricted to a region equal to or smaller than the normal value Win1.

If it is determined that the frequency of execution of external charging is larger than the threshold value (YES in step S10), the electronic control unit 19 sets an upper-limit value Wout of the practical output region to an expanded value Wout2 that is larger in magnitude than the normal value Wout1, and sets an upper-limit value Win of the practical input region to an expanded value Win2 that is larger in magnitude than the normal value Win1. The electronic control unit 19 also in the user of the setting, using the HMI unit 18 (step S22).

Figure 5:
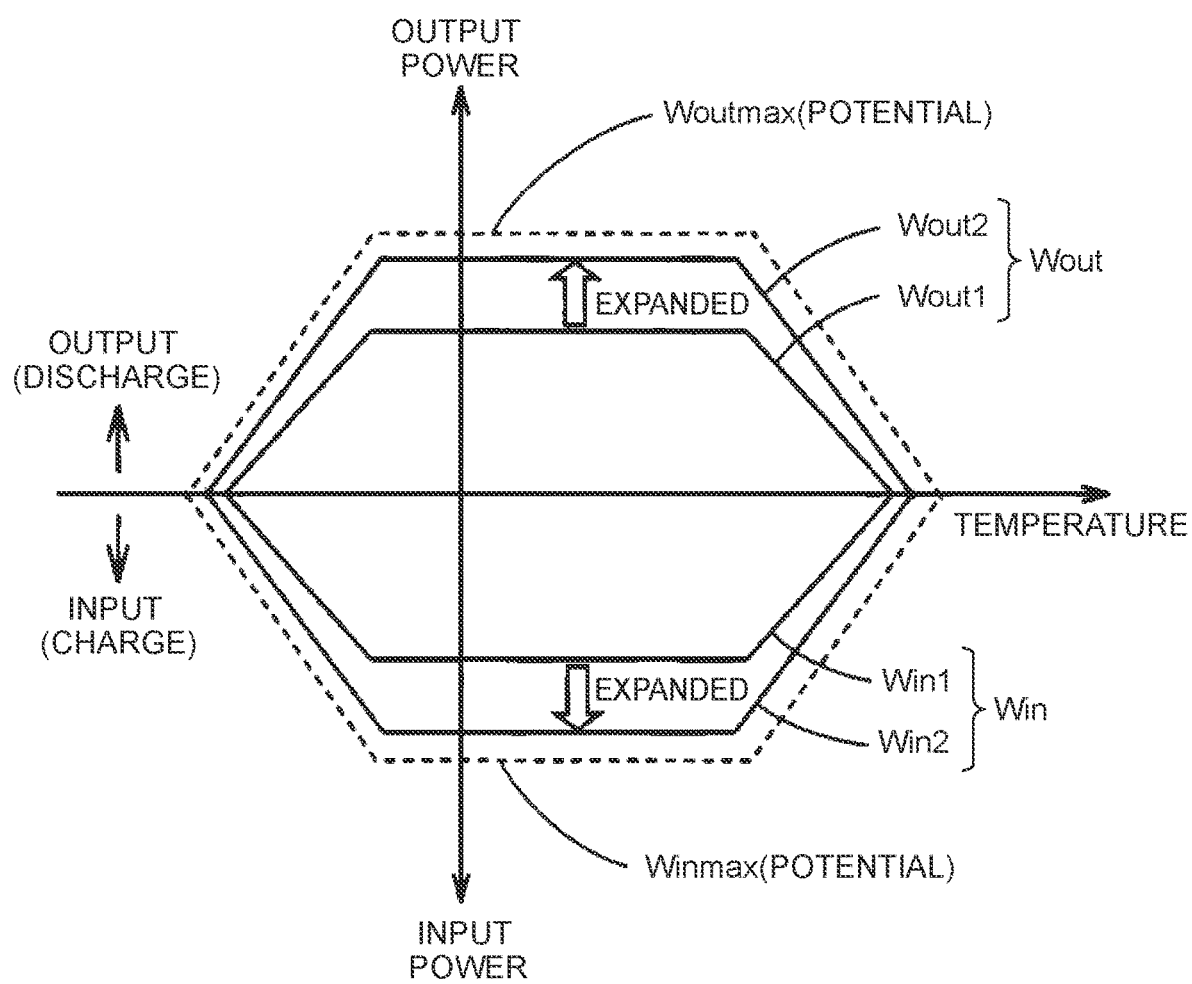
FIG. 5 is a view schematically showing one example of upper-limit values Wout (normal value Wout1, expanded value is Wout2) of a practical output region of the power storage device, and upper-limit values Win (normal value Win1, expanded value Win2) of a practical input region of the power storage device.

FIG. 5 schematically shows one example of the upper-limit values Wout (normal value Wout1, expanded value Wout2) of the practical output region of the power storage device 15, and the upper-limit values Win (normal value Win1, expanded value Win2) of the practical input region of the power storage device 15. The normal values Wout1, Win1 shown in FIG. 5 are values set in step S24 of FIG. 4. The expanded values Wout2, Win2 shown in FIG. 5 are values set in step S22 of FIG. 4. In FIG. 5, the horizontal axis indicates the temperature of the power storage device 15, and the upper side of the vertical axis indicates the output power of the power storage device 15, while the lower side of the vertical axis indicates the input power of the power storage device 15.

The practical output region is a region in which the magnitude (in watts) of the output power of the power storage device 15 is equal to or smaller than the upper-limit value Wout (normal value Wout1 or expanded value Wout2). The practical input region is a region in which the magnitude (in watts) of the input power of the power storage device 15 is equal to or smaller than the upper-limit value Win (normal value Win1 or expanded value Win2).

The normal values Wout1, Win1 and the expanded values Wout2, Win2 are all restricted by control operation to values smaller in magnitude than those (Woutmax, Winmax) of the original potential.

However, the expanded value Wout2 is less restricted by control operation than the normal value Wout1. More specifically, the magnitude of the expanded value Wout2 is set to a larger value than the magnitude of the normal value Wout1. As a result, the practical output region in the case where the expanded value Wout2 is set is larger than the practical output region in the case where the expanded value Wout1 is set. Thus, acceleration power generated by the motor-generator can be increased.

Also, the expanded value Win2 is less restricted by control operation than the normal value Win1. More specifically, the magnitude of the expanded value Win2 is set to a larger value than the magnitude of the normal value Win1. As a result, the practical input region in the case where the expanded value Win2 is set is larger than the practical input region in the case where the normal value Win1 is set. Thus, regenerative power generated by the motor-generator can be increased, and a larger amount of regenerative power can be collected into the power storage device 15.

Accordingly, in the first modified example, the incentive for frequent execution of external charging can be given to the user, so as to increase the acceleration power and regenerative power generated by the motor-generator, and thus improve the driveability.

While both of the practical output region and practical input region of the power storage device 15 are expanded in the example of FIG. 4 and FIG. 5, either one of the practical output region and the practical input region may be expanded.

SECOND MODIFIED EXAMPLE

In the above embodiment, the "frequency of execution of external charging" used in the determination of step S10 of FIG. 2 is the number of times of execution of external charging over an immediate predetermined period. However, the frequency of execution of external charging is not limited to this.

For example, the ratio of the EV traveling distance, or the distance over which the vehicle 10 travels in the EV drive mode, to the sum of the EV traveling distance and the HV traveling distance, over an intermediate predetermined period may be used as the "frequency of execution of external charging". In this case, if the traveling distance (the sum of the EV traveling distance and the HV traveling distance) in one trip (a period from startup of a vehicle system to the next stop of the system) is equal to or larger than the EV travelable distance (i.e., the distance over which the vehicle 10 is able to travel in the EV drive mode), the HV traveling distance during the trip may be excluded when the ratio of the EV traveling distance is calculated. In this manner, the ratio of the EV traveling distance can be prevented from being reduced due to long-distance traveling; therefore, it can be more properly determined whether the user positively utilizes EV traveling.

THIRD MODIFIED EXAMPLE

The vehicle 10 according to the above embodiment is a hybrid vehicle that can be externally charged, and can also travel with fossil fuel. However, the vehicle 10 may be a hybrid vehicle (fuel cell vehicle configured to be able to be externally charged) that can be externally charged, and can also travel using hydrogen as fuel.

The features of the above embodiment and the first to third modified examples may be combined as appropriate a long as there is no technical inconsistency.

It is to be understood that the embodiment and modified examples disclosed herein are exemplary and not restrictive in all respects. The range of this disclosure is defined by the appended claims, rather than the above description, and is intended to include all changes within the range of the claims and equivalents thereof.

What is claimed is:

1. A hybrid vehicle comprising:
a power storage device storing electric power used for traveling;
a power receiving unit receiving electric power for use in external charging from outside the vehicle, the power storage device being configured to be externally charged with the electric power received by the power receiving unit; and
an electronic control unit being configured to execute a restricting operation to restrict a control use region of the power storage device, the control use region is a region defined by an upper-limit value and a lower-limit value of a parameter related to a state of the power storage device, the restriction operation restricts the parameter related to the state of the power storage device to be within the range of the upper limit value and the lower limit value of the control use region,
when a frequency of execution of the external charging is larger than a threshold value, the electronic control unit being configured to execute an expanding operation such that the control use region becomes larger than when the frequency of execution of the external charging is smaller than the threshold value, the expanding operation being an operation to expand the control use region of the power storage device by reducing the restriction placed by the restricting operation,
wherein the parameter related to the state of the power storage device is a state of charge of the power storage device.

2. The hybrid vehicle according to claim 1, wherein:
the restricting operation includes operation to restrict the control use region of the state of charge of the power storage device; and
the expanding operation includes operation to expand the control use region of the state of charge by reducing the restriction placed by the restricting operation.

3. A hybrid vehicle comprising:
a power storage device storing electric power used for traveling;
a power receiving unit receiving electric power for use in external charging from outside the vehicle, the power storage device being configured to be externally charged with the electric power received by the power receiving unit; and
an electronic control unit being configured to execute a restricting operation to restrict a control use region of the power storage device, the control use region is a region defined by an upper-limit value and a lower-limit value of a parameter related to a state of the power storage device, the restriction operation restricts the parameter related to the state of the power storage device to be within the range of the upper limit value and the lower limit value of the control use region,
when a frequency of execution of the external charging is larger than a threshold value, the electronic control unit being configured to execute an expanding operation such that the control use region becomes larger than when the frequency of execution of the external charging is smaller than the threshold value, the expanding operation being an operation to expand the control use region of the power storage device by reducing the restriction placed by the restricting operation,
wherein the parameter related to the state of the power storage device is an output power of the power storage device and an input power of the power storage device.

4. A method of controlling a hybrid vehicle,
the hybrid vehicle including a power storage device that stores electric power used for traveling, a power receiving unit that receives electric power for use in external charging from outside the vehicle, and an electronic control unit, the power storage device being configured to be externally charged with the electric power received by the power receiving unit,
the method of controlling comprising:
executing, by the electronic control unit, a restricting operation to restrict a control use region of the power storage device, the control use region is a region defined by an upper limit value and a lower limit value of a parameter related to a state of the power storage device, the restriction operation restricts the parameter related to the state of the power storage device to be within the range of the upper limit value and the lower limit value of the control use region; and
executing, by the electronic control unit, an expanding operation, when a frequency of execution of the external charging is larger than a threshold value, such that the control use region becomes larger than that when the frequency of execution of the external charging is smaller than the threshold value, the expanding operation being an operation to expand the control use region of the power storage device by reducing the restriction placed by the restricting operation,
wherein the parameter related to the state of the power storage device is (i) a state of charge of the power storage device or (ii) an output power of the power storage device and an input power of the power storage device.

5. The method according to claim 4, wherein:
the parameter related to the state of the power storage device is the state of charge of the power storage device;
the restricting operation includes operation to restrict the control use region of the state of charge of the power storage device; and
the expanding operation includes operation to expand the control use region of the state of charge by reducing the restriction placed by the restricting operation.

6. The method according to claim 4, wherein:
the parameter related to the state of the power storage device is the output power of the power storage device and the input power of the power storage device;
the restricting operation includes at least one of an operation to restrict the upper-limit value of the control use region of the output power of the power storage device, and an operation to restrict the upper-limit value of the control use region of the input power of the power storage device; and
the expanding operation includes at least one of an operation to expand the control use region of the output power by reducing the restriction placed by the restricting operation, and an operation to expand the control use region of the input power by reducing the restriction placed by the restricting operation.

7. The hybrid vehicle according to claim 5, wherein:
the restricting operation includes at least one of an operation to restrict the upper-limit value of the control use region of the output power of the power storage device, and an operation to restrict the upper-limit value of the control use region of the input power of the power storage device; and the expanding operation includes at least one of an operation to expand the control use region of the output power by reducing the restriction placed by the restricting operation, and an operation to expand the control use region of the input power by reducing the restriction placed by the restricting operation.

\* \* \* \* \*

UNITED STATES PATENT AND TRADEMARK OFFICE
CERTIFICATE OF CORRECTION

PATENT NO. : 10,807,484 B2  
APPLICATION NO. : 15/859911  
DATED : October 20, 2020  
INVENTOR(S) : Shigeki Kinomura It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

In the Specification

In Column 3, Line(s) 59, after "value", delete "is".

In Column 4, Line(s) 19, after "charges", delete ",".

In Column 4, Line(s) 20, after "feeding", delete ",".

In Column 5, Line(s) 36, after "traveling", delete ",".

In Column 6, Line(s) 39, after "region", delete ".".

In Column 6, Line(s) 45, after "increase", delete ",".

In Column 7, Line(s) 34, after "also", delete "in" and insert --informs--, therefor.

In Column 8, Line(s) 60, after "appropriate", delete "a" and insert --as--, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*